(12) United States Patent
Sumiya et al.

(10) Patent No.: US 7,560,839 B2
(45) Date of Patent: Jul. 14, 2009

(54) ELECTRIC MOTOR AND FUEL PUMP HAVING THE SAME

(75) Inventors: Shinji Sumiya, Hekinan (JP); Kiyoshi Nagata, Nagoya (JP); Hiromi Sakai, Nukata-gun (JP); Takeo Fukuda, Sakuragawa (JP)

(73) Assignee: Denso Corporation, Kariya (JP)

( * ) Notice: Subject to any disclaimer, the term of this patent is extended or adjusted under 35 U.S.C. 154(b) by 270 days.

(21) Appl. No.: 11/593,160

(22) Filed: Nov. 6, 2006

(65) Prior Publication Data

US 2007/0103014 A1 May 10, 2007

(30) Foreign Application Priority Data

Nov. 4, 2005 (JP) .............................. 2005-320932

(51) Int. Cl.
*H02K 11/00* (2006.01)
(52) U.S. Cl. .......................................... 310/71; 310/43
(58) Field of Classification Search .................... 310/71, 310/260, 43
See application file for complete search history.

(56) References Cited

U.S. PATENT DOCUMENTS

| 6,674,195 | B2 * | 1/2004 | Yagyu et al. .................. 310/71 |
| 6,914,356 | B2 * | 7/2005 | Yamamura et al. ............ 310/71 |
| 7,084,547 | B2 | 8/2006 | Moroto et al. |
| 7,157,828 | B2 * | 1/2007 | Moroto et al. .............. 310/261 |

* cited by examiner

*Primary Examiner*—Dang D Le
(74) *Attorney, Agent, or Firm*—Nixon & Vanderhye, PC (57) ABSTRACT

A stator of an electric motor includes coil cores, bobbins and coils. The coil cores include six coil cores, which are arranged at equal angular intervals in a circumferential direction. The bobbins respectively cover outer peripheral surfaces of the coil cores, and the coils are respectively wound around outer peripheral surfaces of the bobbins. Among the six coils, each diametrically opposed two coils are electrically connected to each other through the corresponding connection line. Positioning members displace positions of the connection lines from one another, so that interference between the connection lines and interference between the connection line and the coils are limited.

11 Claims, 7 Drawing Sheets

ELECTRIC MOTOR AND FUEL PUMP HAVING THE SAME

CROSS REFERENCE TO RELATED APPLICATION

This application is based on and incorporates herein by reference Japanese Patent Application No. 2005-320932 filed on Nov. 4, 2005.

BACKGROUND OF THE INVENTION

1. Field of the Invention

The present invention relates to an electric motor and a fuel pump having the same.

2. Description of Related Art

There is a known fuel pump that uses an electric motor as a drive source, in which electric current supplied to coils of a rotor is commutated (see, for example, Japanese Unexamined Patent Publication No. 2004-312812, which corresponds to U.S. Pat. No. 7,084,547 B2). In Japanese Unexamined Patent Publication No. 2004-312812, among segments of the commutator, which are arranged one after another in a rotational direction of the commutator, the segments of the same electrical potential are electrically interconnected by a corresponding connection terminal, which is in a form of a metal plate, to electrically connect between the corresponding coils, which are electrically connected to the segments of the same electrical potential.

However, when the connection terminal is used to electrically connect between the coils, the connection terminal needs to be processed into a rather complicated shape, as in the case of Japanese Unexamined Patent Publication No. 2004-312812. Therefore, the manufacturing costs are disadvantageously increased. Even in a brushless motor, which does not use a commutator, when coils are electrically connected by a connection terminal of the above type, the connection terminal needs to be processed into a rather complicated shape, thereby disadvantageously resulting in an increase in the manufacturing costs.

When the coils are connected by a connection line without using the connection terminal, the coils can be electrically connected in a simple and inexpensive manner. However, when an external force, such as vibration, is applied, the position of the connection line may possibly deviate, and the adjacent connection lines may interfere with each other, or the connection line and the coil may interfere with each other.

SUMMARY OF THE INVENTION

The present invention addresses the above disadvantages. Thus, it is an objective of the present invention to provide an electric motor, in which coils are electrically connected by connection lines in a simple and inexpensive manner, and interference between the connection lines and interference between the connection lines and the coils are limited. It is another objective of the present invention to provide a fuel pump, which has such an electric motor.

To achieve the objectives of the present invention, there is provided an electric motor, which includes a stator, a rotor, a plurality of coil cores, a permanent magnet, a plurality of coils, a plurality of connection lines, a plurality of positioning members. The rotor is rotatably arranged at radially inward of the stator. The coil cores are circumferentially arranged one after another in one of the stator and the rotor. The permanent magnet is provided in the other one of the stator and the rotor and includes magnetic poles of opposite polarities, which are alternately arranged in a circumferential direction of the electric motor along an opposed surface of the permanent magnet that is radially opposed to the plurality of coil cores. Each of the plurality of coils is wound around a corresponding one of the plurality of coil cores. The plurality of coils switches magnetic poles, which are formed in opposed surfaces of the plurality of coil cores radially opposed to the permanent magnet, when energization of the plurality of coils is controlled. Each of the plurality of connection lines electrically interconnects corresponding at least two of the plurality of coils. The positioning members position the plurality of connection lines and limit interference between the connection lines and interference between the connection lines and the coils.

At least one of the plurality of positioning members may hold generally parallel sections of at least two of the plurality of connection lines. Furthermore, the generally parallel sections of the at least two of the plurality of connection lines may be spaced from each other and may be generally parallel to each other along an entire circumferential extent of the at least one of the plurality of positioning members.

To achieve the objectives of the present invention, there is also provided a fuel pump, which includes the above electric motor and a pump arrangement. The pump arrangement is driven by the electric motor to draw and pressurize fuel.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

First Embodiment

Figure 2:
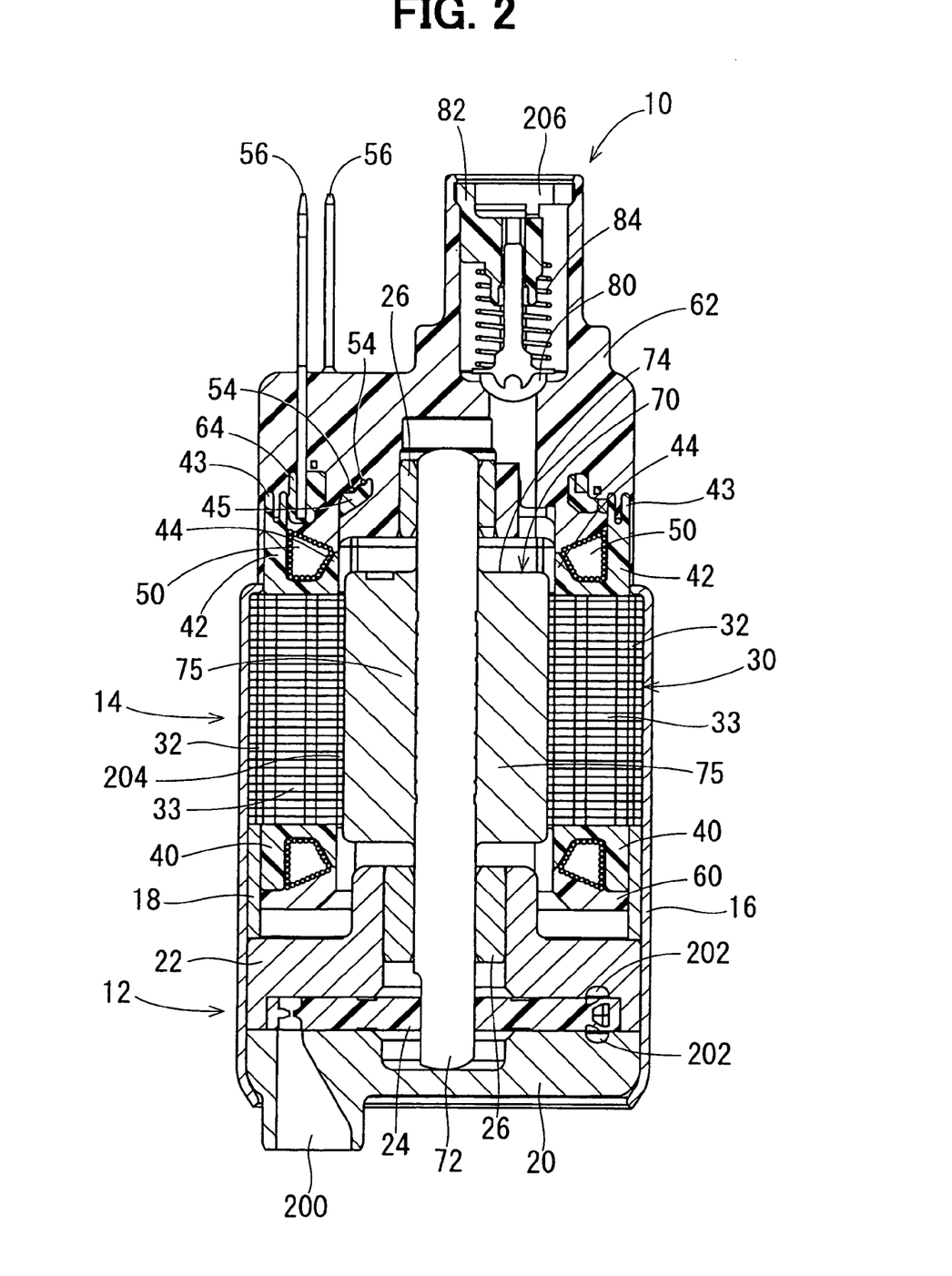
FIG. 2 is a cross sectional view of a fuel pump according to the first embodiment.

FIG. 2 shows a fuel pump that has an electric motor according to a first embodiment of the present invention. The fuel pump 10 of the present embodiment is an in-tank type turbine pump, which is placed in a fuel tank of a motorcycle with 150 cc or less displacement.

The fuel pump 10 includes a pump arrangement 12 and a motor arrangement 14. The motor arrangement 14 drives the pump arrangement 12 to rotate it. A housing of the fuel pump 10 is made of housings 16, 18. Each of the housings 16, 18 is made by press working of a thin metal plate into a corresponding cylindrical form. The housing 18 is fixed to the housing 16 by press fitting. The housing 16 serves as a housing of the pump arrangement 12 and of the motor arrangement 14 and has a wall thickness of about 0.5 mm. A pump case segment 20 is fixed to one axial end part (a lower end part in FIG. 2) of the housing 16 by swaging, and coil cores 32 of a stator 30 are fixed to the other axial end part (an upper end part in FIG. 2) of the housing 16 by swaging. A pump case segment 22 abuts against one axial end part (a lower end part in FIG. 2) of the housing 18 to axially position the pump case segment 22, and the coil cores 32 abut against the other axial end part (an upper end part) of the housing 18 to axially position the coil cores 32.

The pump arrangement 12 is a turbine pump, which includes the pump case segments 20, 22 and an impeller 24. The pump case segment 22 is press fitted into the housing 16 and axially abuts against the housing 18. The pump case segments 20, 22 form a pump case, which rotatably receives the impeller 24 that serves as a rotatable member. A C-shaped pump passage 202 is respectively formed between the pump case segment 20 and the impeller 24 and also between the pump case segment 22 and the impeller 24. Fuel is drawn through an inlet opening 200, which is formed in the pump case segment 20, and is pressurized in the pump passages 202 through the rotation of the impeller 24. Then, the pressurized fuel is outputted to the motor arrangement 14. The fuel, which is pumped to the motor arrangement 14, passes through a fuel passage 204, which is formed between the stator 30 and a rotor 70. Thereafter, the fuel is discharged from an outlet opening 206 to an engine.

The motor arrangement 14, which serves as the electric motor, is a brushless motor. The stator 30 of the motor arrangement 14 includes the coil cores 32, bobbins 40 and coils 50. The six coil cores 32 are arranged one after another at regular intervals in a circumferential direction. Each coil core 32 is made of a plurality of magnetic steel plates, which are stacked in the axial direction and are fixed together by swaging. The six coil cores 32 form a stator core. Each coil core 32 includes a tooth 33, which radially inwardly projects from an outer peripheral side of the coil core 32 toward a center of the motor arrangement 14.

Figure 1A:
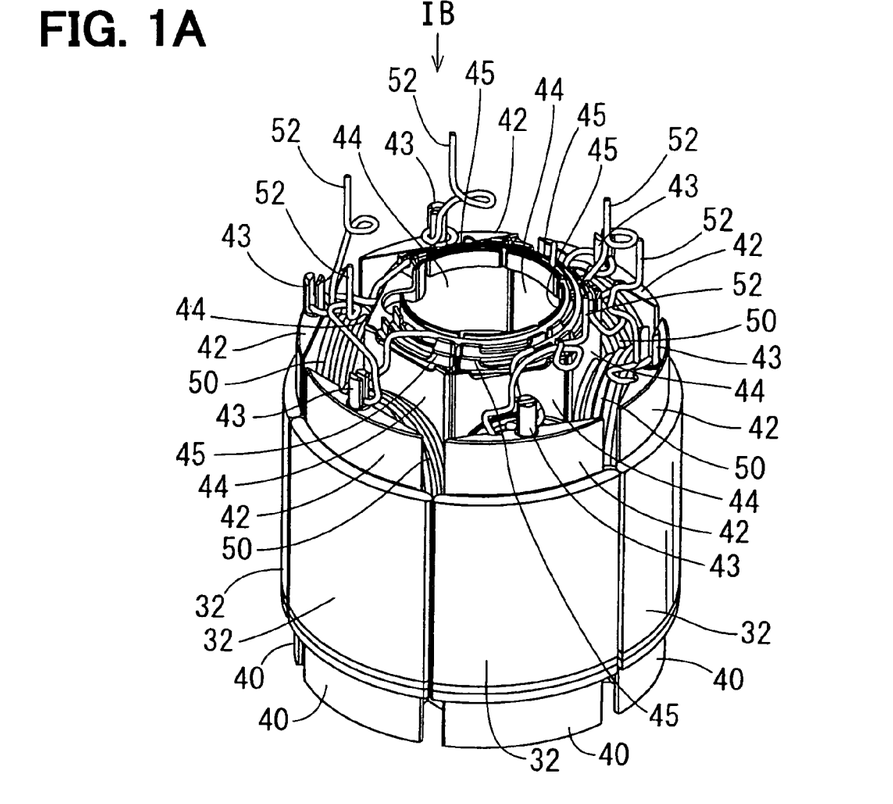
FIG. 1A is a perspective view showing a stator of an electric motor according to a first embodiment of the present invention.
Figure 1B:
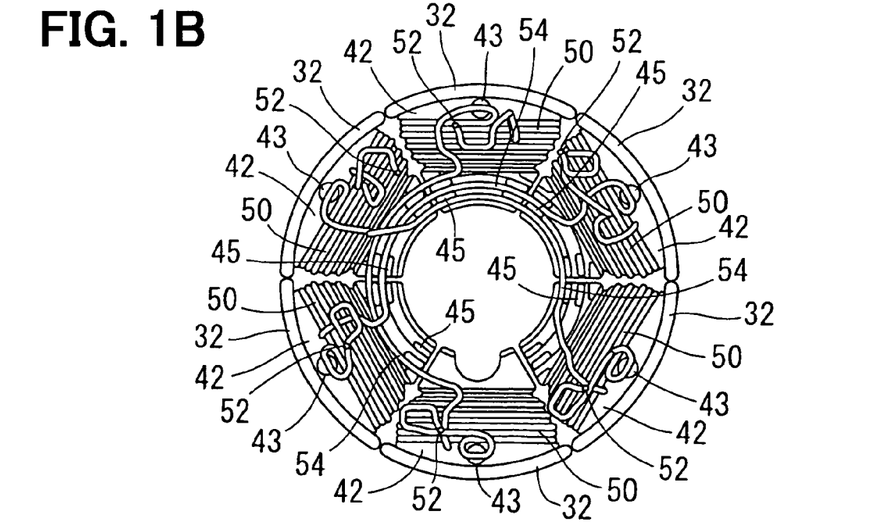
FIG. 1B is an end view taken in a direction of an arrow IB in FIG. 1A.
Figure 4A:
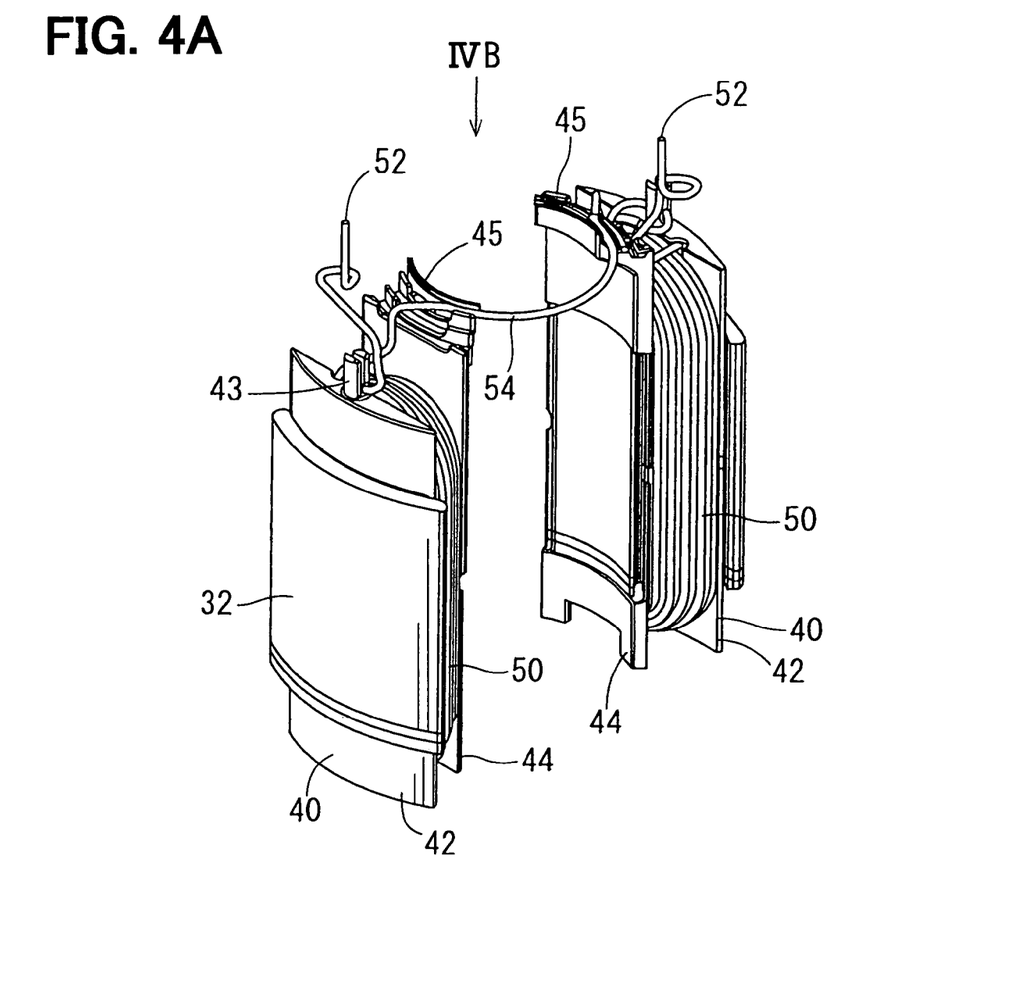
FIG. 4A is a perspective view showing a state where opposed coils are connected by a connection line according to the first embodiment.
Figure 4B:
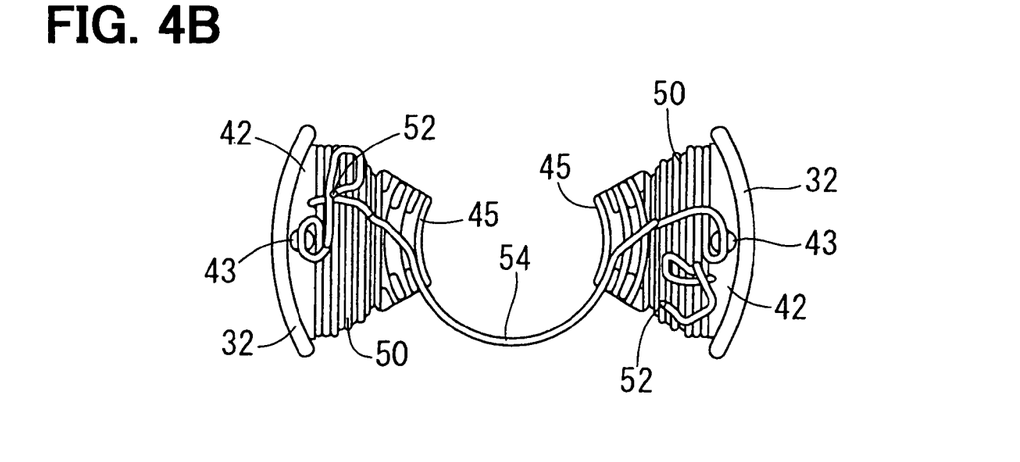
FIG. 4B is an end view taken in a direction of an arrow IVB in FIG. 4A.

Each bobbin 40, which is made of dielectric resin (a dielectric material), covers an outer peripheral surface of the corresponding tooth 33. As shown in FIGS. 1A and 1B, each bobbin 40 includes an outer flange 42 on a radially outer side thereof and an inner flange 44 on a radially inner side thereof. A winding space is formed between the outer flange 42 and the inner flange 44. Each winding is wound in the corresponding winding space to form the corresponding coil 50. Among the six coils 50 of the motor arrangement 14, each diametrically opposed two coils 50 are electrically connected by a corresponding connection line 54. In the present embodiment, a single winding is used to continuously form the corresponding diametrically opposed two coils 50 and the connection line 54. Specifically, as shown in FIGS. 4A and 4B, the diametrically opposed two coils 50, which are diametrically opposed in the stator 30, are formed by winding the single winding around the diametrically opposed two bobbins 40, and the same winding is used to form the connection line 54 that connects between the diametrically opposed coils 50. In this instance, a section of the connection line 54, which is located between the diametrically opposed two coils 50, has a generally arcuate shape to form the generally arcuate section. Three sets of the assemblies, one of which is shown in FIGS. 4A and 4B, are assembled together to form the stator 30 shown in FIGS. 1A and 1B. In the three sets of the assemblies, the generally arcuate sections (generally parallel sections) of the three connection lines 54 are spaced from each other and are generally parallel to each other.

An engaging portion 43 is formed in a terminal 56 (FIG. 2) side axial end part of the outer flange 42 of each bobbin 40 to engage with a winding end 52 of the corresponding coil 50, so that the winding end 52 of the coil 50 is anchored to the engaging portion 43. A stepped positioning member 45, which include a plurality of steps, is formed in the inner flange 44 of the bobbin 40 in a terminal 56 side axial end part of the inner flange 44. The steps of the positioning member 45 are radially inwardly arranged one after another toward the center and at the same time axially ascend toward the terminal 56 side. The positioning member 45 is resin molded integrally with the bobbin 40 and is positioned on a radially inner side of the coil 50.

Figure 3:
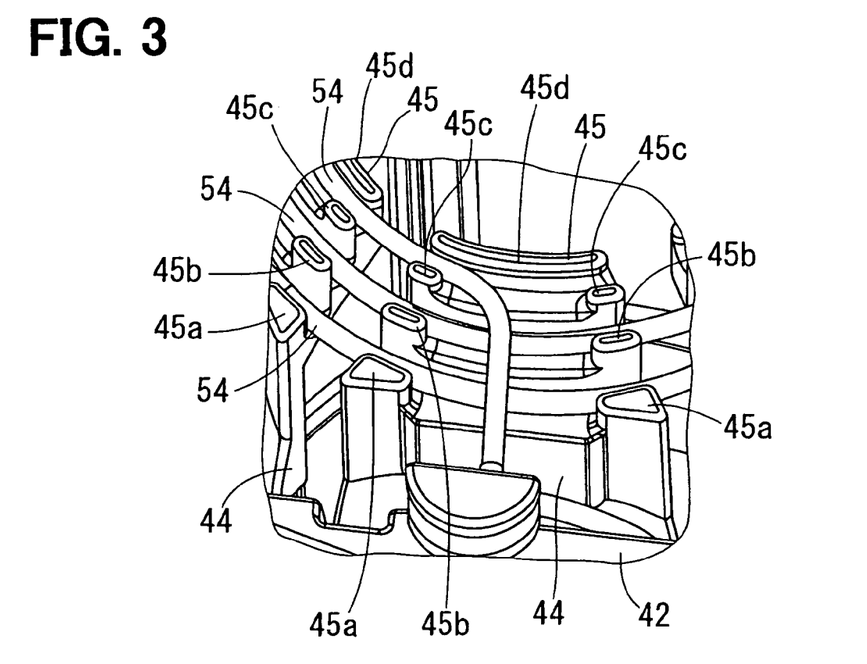
FIG. 3 is an enlarged partial view showing a positioning member according to the first embodiment.

Furthermore, as shown in FIG. 3, the positioning member 45 includes axial projections 45a, 45b, 45c, 45d, which are arranged in this order from a radially outer side to a radially inner side of the positioning member 45. The projections 45a, 45b, 45c are paired such that the two projections 45a, 45b, 45c of each pair are circumferentially spaced from each other and form a set in the positioning member 45. The projection 45d is formed as a single arcuate projection that has an arc shape in the positioning member 45. The connection line 54 circumferentially passes between the projection(s) 45a and the projection(s) 45b, between the projection(s) 45b and the projection(s) 45c, or between the projection(s) 45c and the projection 45d in the respective corresponding positioning member 45. Specifically, in FIG. 3, the connection line 45, which extends radially inward from the coil 50, passes through and is clamped between the projection 45c and the projection 45d of the one positioning member 45. Then, the same connection line 45 is passed to the left side positioning member 45 in FIG. 3 and passes through and is claimed between the projections 45c and the projection 45, and so on. In this way, the connection lines 54 are separated by the projections 45a, 45b, 45c, 45d and are thereby displaced from each other in the radial direction and the axial direction.

Each coil 50 is electrically connected to the terminals 56 through the corresponding winding ends 52. The energization of each coil 50 is controlled according to the rotational position of the rotor 70 shown in FIG. 2. The coils 50 and the connection lines 54 are covered with dielectric resin 60. The end cover 62 is molded integrally with the dielectric resin 60 at the time of molding the dielectric resin 60.

A collapse limiting member 64 is formed as an annular body, which has a central through hole and covers the terminal 56 side axial ends of the bobbins 40. Fitting holes are formed in the collapse limiting member 64, and the terminals 56 are fitted into the fitting holes of the collapse limiting member 64. In this way, at the time of molding the dielectric resin 60, it is possible to limit collapse (tumble) of the terminals 56, which would be otherwise caused by a flow the molten resin, so that interference between the terminals 56 and surrounding other components can be limited by limiting the collapse of the terminals 56.

The rotor 70 includes a shaft 72 and a permanent magnet 74 and is rotatably arranged at radially inward of the stator 30. Opposed ends of the shaft 72 are rotatably supported by bearings 26. The permanent magnet 74 is a cylindrical plastic magnet, which is formed by mixing magnetic powder into thermoplastic resin, such as polyphenylene sulfide (PPS) or polyacetal (POM). The permanent magnet 74 has eight magnetic poles 75, which are arranged one after another in the rotational direction. The eight magnetic poles 75 are magnetized in such a manner that different magnetic poles (magnetic poles of opposite polarities) are alternately arranged in the rotational direction along an outer peripheral surface of the permanent magnet 74, which is radially opposed to the coil cores 32.

The outlet opening 206, which is formed by the end cover 62, receives a valve member 80, a stopper 82 and a spring 84. When the pressure of the fuel, which is pressurized in the pump arrangement 12, becomes equal to or greater than a predetermined pressure, the valve member 80 is lifted from a valve seat against a load applied from the spring 84, so that fuel is discharged from the outlet opening 206 to the engine.

In the first embodiment, each connection line 54 is positioned by placing (or by press fitting or by clamping) the connection line 54 between the projections of each corresponding positioning member 45, so that positional deviation of the connection line 54 is limited. In this way, it is possible to limit the interference between the connection lines 54 and also the interference between the connection line 54 and the coil 50. Furthermore, even when the molding pressure is applied to the connection line 54 at the time of molding the dielectric resin 60, application of excessive tension to the connection line 54 is advantageously limited due to the fact that the connection line 54 is positioned and is held by each corresponding positioning member 45.

Furthermore, in the first embodiment, the coils 50 and the connection lines 54 are covered with the dielectric resin 60, so that it is possible to limit contact of debris and the like, which are contained in the fuel, to the coils 50 and the connection lines 54. Also, it is possible to limit collapse of the windings of the coils 50 even when the coils 50 receive the vibration, which is externally applied to the fuel pump 10, or the vibration, which is internally generated due to the operation of the fuel pump 10.

Furthermore, in the first embodiment, each positioning member 45 is formed at the location radially inward of the corresponding coil 50. Thus, at the time of forming the coil 50 by placing the winding around the bobbin 40 in the winding operation, it is possible to limit interference of such an winding operation by the positioning member 45.

Second Embodiment

Figure 5A:
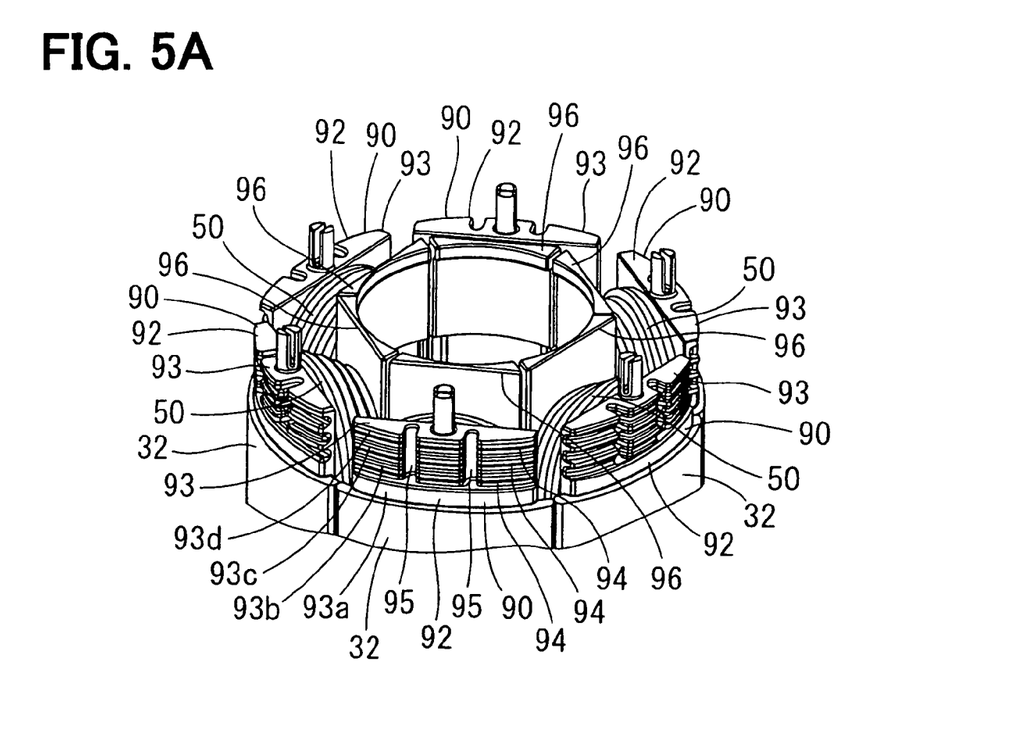
FIG. 5A is a partial perspective view showing positioning members, from which connection lines are omitted, in an electric motor according to a second embodiment of the present invention.
Figure 5B:
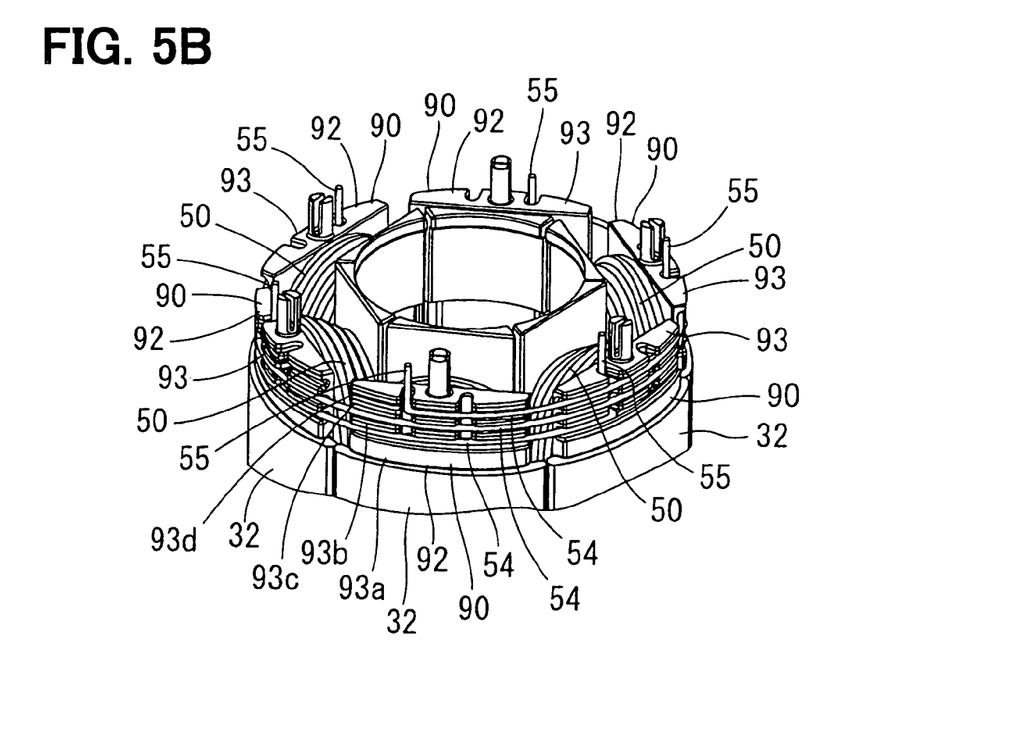
FIG. 5B is a partial perspective view showing the connection lines installed to the positioning members shown in FIG. 5A.

FIGS. 5 A and 5B show a second embodiment of the present invention. An electric motor of the second embodiment is a brushless motor like in the first embodiment and has substantially the same structure as the electric motor of the first embodiment except a structure of each positioning member 93. In the following description, the components, which are similar to those of the first embodiment, will be indicated by the same numerals.

Like in the first embodiment, in the electric motor of the second embodiment, each radially opposed two coils 50 are electrically connected by the connection line 54. FIG. 5A shows a state where the connection lines 54 are omitted for the sake of better understanding, and FIG. 5B shows a state where the connection lines 54 are positioned by the positioning members 93 of the bobbins 90.

Each bobbin 90 includes an outer flange 92 on a radially outer side thereof and an inner flange 96 on a radially inner side thereof, and a winding space is formed between the outer flange 92 and the inner flange 96. Each winding is wound in the corresponding winding space to form the corresponding coil 50.

The positioning member 93 is formed in a terminal 56 side axial end of the outer flange 92 of each bobbin 90 in such a manner that the positioning member 93 axially extends toward the terminals 56. The positioning member 93 is formed at the location radially outward of the coil 50. As shown in FIG. 5A, the positioning member 93 includes projections 93a, 93b, 93c, 93d, which project radially outward and are arranged in this order in the axial direction toward the terminals 56. The projection 93a is formed as a single projection that has an arc shape in each positioning member 93. Furthermore, the projections 93b, 93c, 93d, which are axially arranged in this order, are formed as a set of projections 93b, 93c, 93d, and three sets of projections 93b, 93c, 93d are arranged along the circumferential width of the projection 93a in each positioning member 93. The projection 93a and the axially aligned projections 93b, 93c, 93d form three circumferential grooves 94, which are arranged one after another in the axial direction. Furthermore, the three sets of projections 93b, 93c, 93d define two axial grooves 95 therebetween such that the two axial grooves 95 are circumferentially spaced from each other. A depth of each axial groove 95 is larger than a depth of each circumferential groove 94. In FIGS. 5A and 5B, in order to simplify the drawings, only some of the projections 93a, 93b, 93c, 93d and the grooves 94, 95 are indicated with the corresponding numerals.

In order to make the electrical connection between the diametrically opposed coils 50, each connection line 54 is received through the circumferential grooves 94 all the way to the diametrically opposed bobbin 90, around which the subject coil 50 to be electrically connected is wound. Then, in that bobbin 90, the connection line 54 is displaced from, i.e., is pulled out from the circumferential groove 94 into the axial groove 95 and is electrically connected to the coil 50. In FIG. 5B, a pulled-out part 55 of each connection line 54, which is displaced from the corresponding groove 94 to electrically connect with the coil 50, is depicted in the simplified form without indicating the actual connection to the corresponding coil 50 for the sake of better understanding.

In the second embodiment, at the time of displacing the connection line 54 from the corresponding one of the axially aligned three grooves 94, i.e., the upper, middle and lower grooves 94, into the groove 95, the connection line 54 is displaced directly from the corresponding one of the upper, middle and lower grooves 94. Specifically, the connection line 54 is not displaced from the one of the upper, middle and lower grooves 94 into the other one of the upper, middle and lower grooves 94. Thus, at the time of displacing the connection line 54, the interference of the connection line 54 can be minimized. Furthermore, at the time of displacing the connection line 54 from the groove 94, the connection line 54 is displaced into the groove 95, which has the greater depth in comparison to the groove 94. Thus, it is possible to limit the interference between the connection line 54, which is displaced from the groove 94 into the groove 95 to extend vertically, with the other connection line 54, which is located above the displaced connection line 54 in that groove 95.

Also, in the second embodiment, similar to the first embodiment, the connection line 54 extends through between the projections of the positioning member 93 to position the connection line 54, so that positional deviation of the connection line 54 is advantageously limited. In this way, it is possible to limit the interference between the connection lines 54 and also the interference between the connection line 54 and the coil 50.

Furthermore, each positioning member 93 is formed at the location radially outward of the corresponding coil 50. Thus, at the time of forming the coil 50 by placing the winding around the bobbin 90 in the winding operation, it is possible to limit interference of such an winding operation by the positioning member 93.

Third Embodiment

Figure 6:
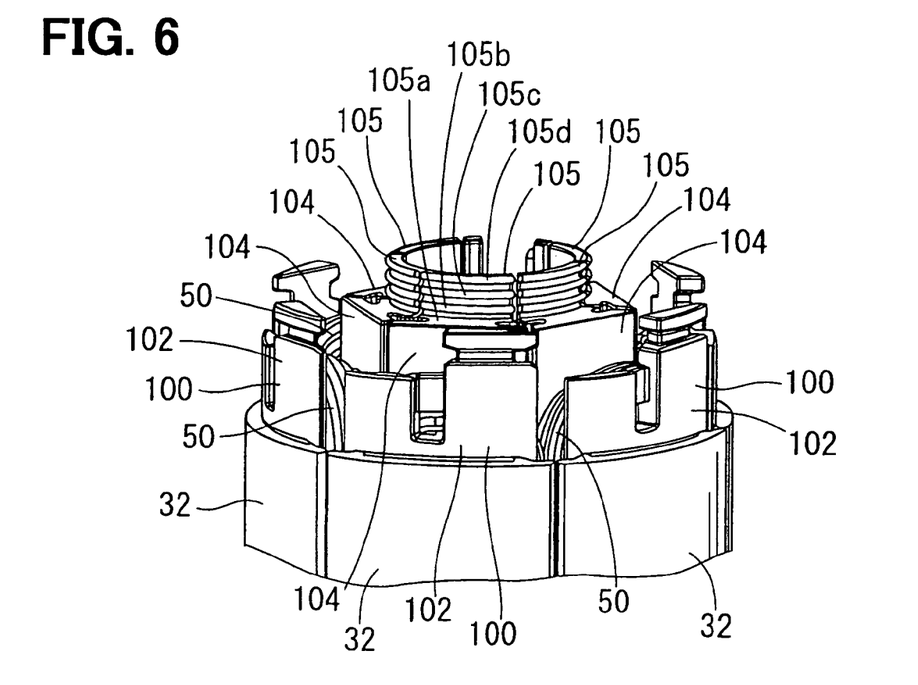
FIG. 6 is a perspective view showing positioning members, from which connection lines are omitted, in an electric motor according to a third embodiment of the present invention.

FIG. 6 shows a third embodiment of the present invention. An electric motor of the third embodiment is a brushless motor like in the first embodiment and has substantially the same structure as the electric motor of the first embodiment except a structure of each positioning member 93. In the following description, the components, which are similar to those of the first embodiment, will be indicated by the same numerals.

Like the first and second embodiments, in the electric motor of the third embodiment, the diametrically opposed two coils 50 are electrically connected together by the connection line. In FIG. 6, the connection lines 54 are omitted for the sake of better understanding.

Each bobbin 100 includes an outer flange 102 on a radially outer side thereof and an inner flange 104 on a radially inner side thereof, and a winding space is formed between the outer flange 102 and the inner flange 104. Each winding is wound in the corresponding winding space to form the corresponding coil 50.

The positioning member 105 is formed in a terminal 56 side axial end of the inner flange 104 of each bobbin 100 in such a manner that the positioning member 105 axially extends toward the terminal 56 side. The positioning member 105 is formed at the location radially inward of the coil 50. In the positioning member 105, a step 105a, which serves as a projection, and radially outwardly projecting projections 105b, 105c, 105d are arranged in this order in the axial direction toward the terminal 56 side. Three circumferential grooves are formed at three locations, which are between the step 105a and the projection 105b, between the projection 105b and the projection 105c and between the projection 105c and the projection 105d. In FIG. 6, in order to simplify the drawing, only some of the steps 105a and the projections 105b, 105c, 105d are indicated with the corresponding numerals.

In the third embodiment, similar to the first embodiment, the step 105a and the projections 105b, 105c, 105d of each positioning member 105 are used to position each corresponding connection line 54 to limit positional deviation of the connection line 54. In this way, it is possible to limit the interference between the connection lines 54 and also the interference between the connection line 54 and the coil 50.

Furthermore, each positioning member 105 is formed at the location radially inward of the corresponding coil 50. Thus, at the time of forming the coil 50 by placing the winding around the bobbin 100 in the winding operation, it is possible to limit interference of such an winding operation by the positioning member 105.

Fourth Embodiment

Figure 7A:
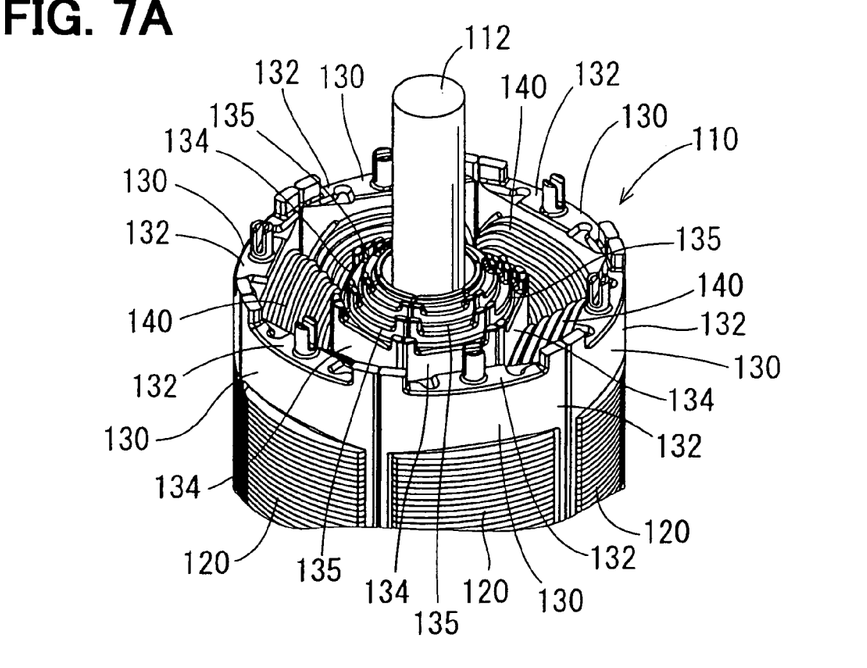
FIG. 7A is a perspective view showing a rotor of an electric motor according to a fourth embodiment of the present invention.
Figure 7B:
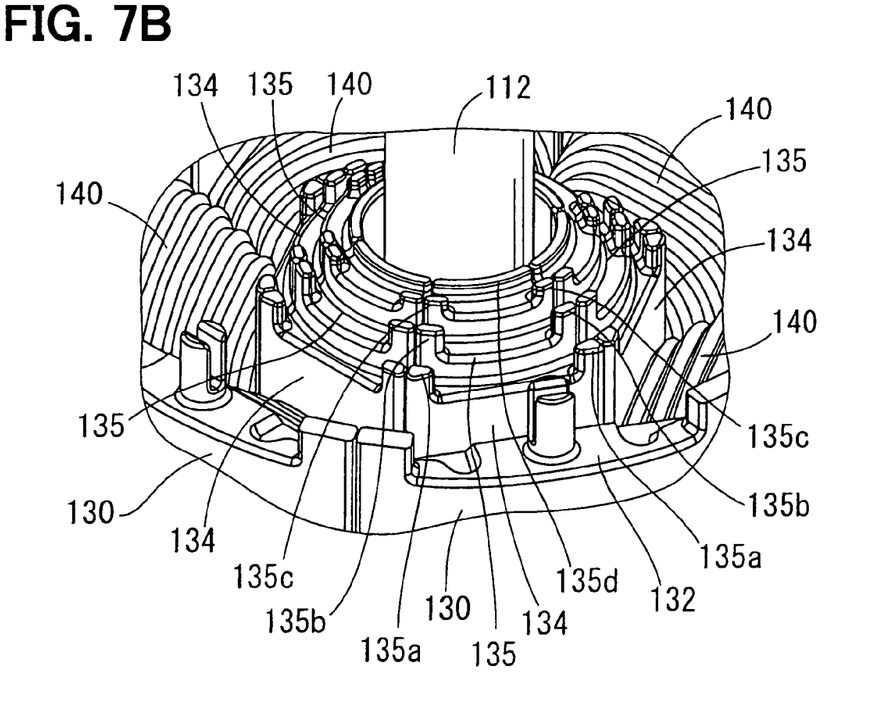
FIG. 7B is an enlarged partial view showing positioning members of FIG. 7A.
Figure 8:
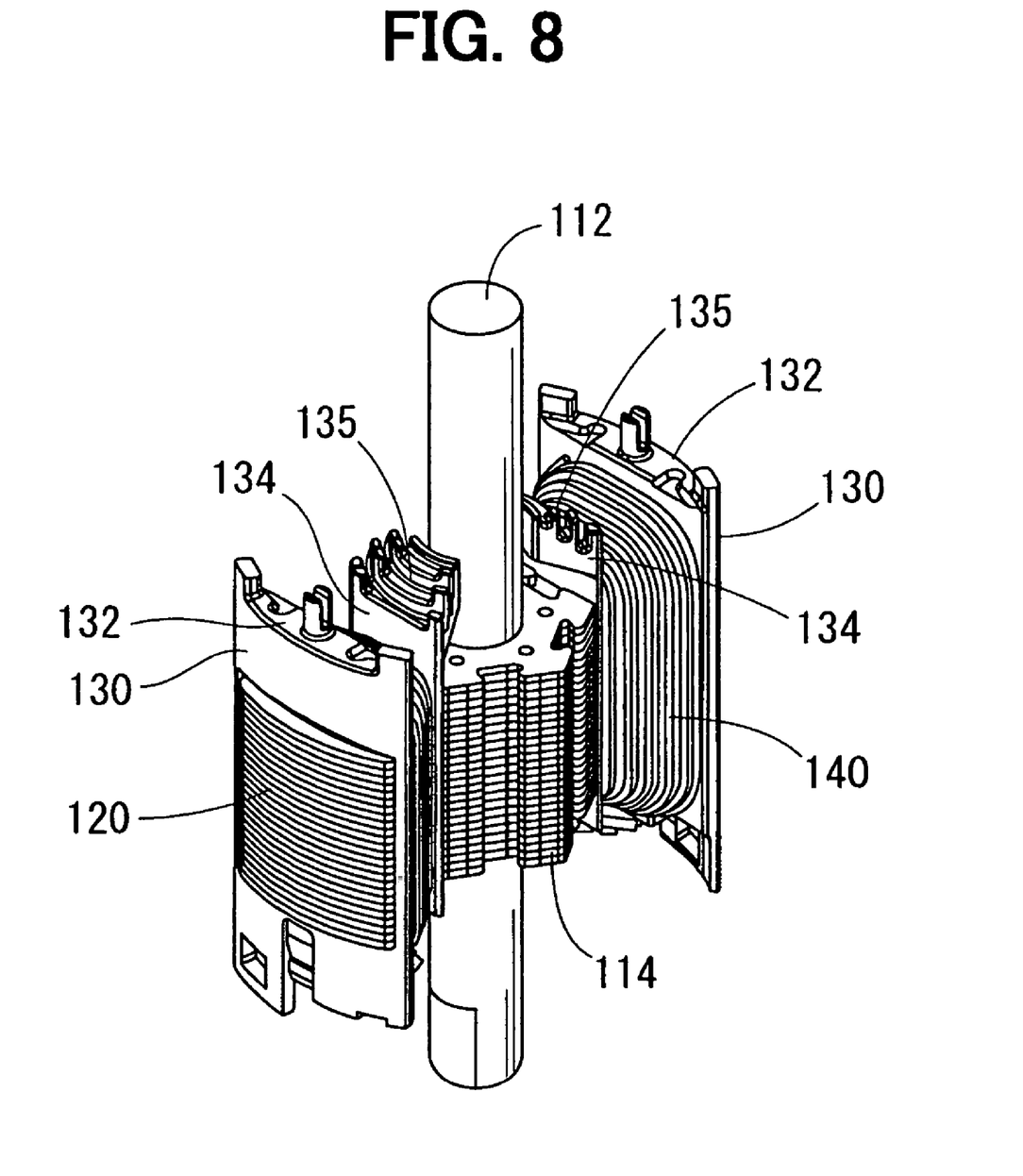
FIG. 8 is a perspective view showing opposed coils, which are connected by a connection line, according to the fourth embodiment.

FIGS. 7A to 8 show a fourth embodiment of the present invention. An electric motor of the fourth embodiment is not the brushless motor but is a brush motor, which includes a commutator to commutate the electric current that is supplied to coils 140. A rotor 110 of the electric motor of the fourth embodiment is rotatably supported at radially inward of a permanent magnet (not shown), which forms different magnetic poles that are alternately arranged in a circumferential direction. In FIGS. 7A to 8, connection lines, each of which connects between the corresponding coils 140, are omitted for the same of better understanding.

As shown in FIGS. 7A and 7B, the rotor 110 includes a shaft 112, a center core 114 (FIG. 8), six coil cores 120, bobbins 130 and coils 140. The center core 114 is fixed to the shaft 112. The six coil cores 120 are arranged one after another in a rotational direction and are fixed to the center core 114. Each of the bobbins 130 covers an outer peripheral surface of the corresponding one of the coil cores 120. The coils 140 are wound around the bobbins 130.

Each bobbin 130 includes an outer flange 132 on a radially outer side thereof and an inner flange 134 on a radially inner side thereof, and a winding space is formed between the outer flange 132 and the inner flange 134. Each winding is wound in the corresponding winding space through a concentrated winding technique to form the corresponding coil 140. Among the six coils 140, each radially opposed two coils 140 (FIG. 8) are electrically connected together through the corresponding connection line (not shown). In the fourth embodiment, a single winding is used to continuously form the corresponding diametrically opposed two coils 140 and the connection line.

A stepped positioning member 135, which includes a plurality of steps, is formed in the inner flange 134 of the bobbin 130 on a commutator side of the inner flange 134. The steps of the positioning member 135 are radially inwardly arranged one after another toward the center and at the same time axially ascend toward the commutator side. The positioning member 135 is formed at the location radially inward of the coil 140.

Further specifically, in the positioning member 135, projections 135a, 135b, 135c, 135d, which axially project toward the commutator side, are arranged in this order from the radially outer side to the radially inner side. The projections 135a, 135b, 135c are paired such that the two projections 135a, 135b, 135c of each pair are circumferentially spaced from each other and form a set in the positioning member 135. The projection 135d is formed as a single arcuate projection that has an arc shape in the positioning member 135. The connection line circumferentially passes between the projection(s) 135a and the projection(s) 135b, between the projection(s) 135b and the projection(s) 135c, or between the projection(s) 135c and the projection 135d. Each coil 140 is electrically connected to the terminals located on the commutator side through the corresponding winding ends.

Now, modifications of the above embodiments will be described.

In the above embodiments, each connection line and its corresponding two coils are made from the single winding. Alternatively, the two coils may be electrically connected by a separate connection line, which is different from that of the coils.

Furthermore, in the above embodiments, each diametrically opposed two coils are electrically connected by the corresponding connection line. Alternatively, not only the two coils, but three or more coils may be electrically connected together by the connection line(s). Furthermore, each positioning member, which positions the connection line, may be formed as a separate member, which is formed separately from the corresponding bobbin.

In the above embodiment, the electric motor of the present invention is implemented in the fuel pump. Alternatively, the electric motor of the present invention may be implemented in other drive sources other than that of the fuel pump.

Also, in the fuel pump of the above embodiment, the pump arrangement is made by the turbine pump, which includes the impeller 24. Alternatively, the pump arrangement may be made by another type of pump, such as a gear pump.

Additional advantages and modifications will readily occur to those skilled in the art. The invention in its broader terms is therefore not limited to the specific details, representative apparatus, and illustrative examples shown and described.

What is claimed is:

1. An electric motor comprising:
    a stator;
    a rotor that is rotatably arranged at radially inward of the stator;
    a plurality of coil cores that are circumferentially arranged one after another in one of the stator and the rotor;
    a permanent magnet that is provided in the other one of the stator and the rotor and includes magnetic poles of opposite polarities, which are alternately arranged in a circumferential direction of the electric motor along an opposed surface of the permanent magnet that is radially opposed to the plurality of coil cores;
    a plurality of coils, each of which is wound around a corresponding one of the plurality of coil cores, wherein the plurality of coils switches magnetic poles, which are formed in opposed surfaces of the plurality of coil cores radially opposed to the permanent magnet, when energization of the plurality of coils is controlled;
    a plurality of connection lines, each of which electrically interconnects corresponding at least two of the plurality of coils; and
    a plurality of positioning members that position the plurality of connection lines and limit interference between the connection lines and interference between the connection lines and the coils, wherein:
    each of the plurality of connection lines and the corresponding at least two of the plurality of coils are made from a single winding, which forms the corresponding at least two of the plurality of coils, and
    the plurality of coils and the plurality of connection lines are covered with dielectric resin.

2. The electric motor according to claim 1, further comprising a plurality of bobbins, each of which covers an outer peripheral surface of a corresponding one of the plurality of coil cores, and around each of which a corresponding one of the plurality of coils is wound, wherein each of the plurality of positioning members is provided to a corresponding one of the plurality of bobbins.

3. The electric motor according to claim 1, wherein the plurality of positioning members is radially displaced from the plurality of coils.

4. The electric motor according to claim 1, wherein at least one of the plurality of positioning members includes at least one projection, which partitions between at least two of the plurality of connection lines and displaces the at least two of the plurality of connection lines from one another.

5. The electric motor according to claim 1, wherein at least one of the plurality of positioning members displaces at least two of the plurality of connection lines from one another in a radial direction of the electric motor.

6. The electric motor according to claim 1, wherein at least one of the plurality of positioning members displaces at least two of the plurality of connection lines from one another in an axial direction of the electric motor.

7. The electric motor according to claim 6, wherein each of the plurality of connection lines is pulled out from a corresponding axial position, at which the connection line is positioned by a corresponding one of the plurality of positioning members, to electrically connect with a corresponding one of the plurality of coils.

8. The electric motor according to claim 1, wherein each of the plurality of positioning members is made of a dielectric material and clamps each contacting one of the plurality of connection lines, which contacts the positioning member.

9. The electric motor according to claim 1, wherein:
    each of the plurality of connection lines has a generally arcuate section: and
    the generally arcuate sections of each adjacent two of the plurality of connection lines are spaced from each other and are generally parallel to each other.

10. The electric motor according to claim 1, wherein:
    at least one of the plurality of positioning members holds generally parallel sections of at least two of the plurality of connection lines; and
    the generally parallel sections of the at least two of the plurality of connection lines are spaced from each other and are generally parallel to each other along an entire circumferential extent of the at least one of the plurality of positioning members.

11. A fuel pump comprising:
    an electric motor including: a stator; a rotor that is rotatably arranged at radially inward of the stator; a plurality of coil cores that are circumferentially arranged one after another in one of the stator and the rotor: a permanent magnet that is provided in the other one of the stator and the rotor and includes magnetic Doles of opposite polarities, which are alternately arranged in a circumferential direction of the electric motor along an opposed surface of the permanent magnet that is radially opposed to the plurality of coil cores; a plurality of coils, each of which is wound around a corresponding one of the plurality of coil cores, wherein the plurality of coils switches magnetic poles. which are formed in opposed surfaces of the plurality of coil cores radially opposed to the permanent magnet, when energization of the plurality of coils is controlled; a plurality of connection lines, each of which electrically interconnects corresponding at least two of the plurality of coils; and a plurality of positioning members that position the plurality of connection lines and limit interference between the connection lines and interference between the connection lines and the coils, wherein each of the plurality of connection lines and the corresponding at least two of the plurality of coils are made from a single winding, which forms the corresponding at least two of the plurality of coils, and the plurality of coils and the plurality of connection lines are covered with dielectric resin; and
    a pump arrangement that is driven by the electric motor to draw and pressurize fuel.

* * * * *